(12) United States Patent
Army et al.

(10) Patent No.: US 12,036,498 B2
(45) Date of Patent: Jul. 16, 2024

(54) MID-PRESSURE WATER COLLECTOR (MPWC) WITH HELICAL FLOW CHANNEL AND RADIAL SCUPPERS

(71) Applicant: Hamilton Sundstrand Corporation, Charlotte, NC (US)

(72) Inventors: Donald E. Army, Enfield, CT (US); Liana Frangioni, Windsor Locks, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/733,477

(22) Filed: Apr. 29, 2022

(65) Prior Publication Data

US 2023/0347270 A1 Nov. 2, 2023

(51) Int. Cl.
*B01D 45/16* (2006.01)
*B01D 53/26* (2006.01)
*B64D 13/06* (2006.01)

(52) U.S. Cl.
CPC ........... *B01D 45/16* (2013.01); *B01D 53/265* (2013.01); *B64D 13/06* (2013.01); *B64D 2013/0666* (2013.01)

(58) Field of Classification Search
CPC ...... B01D 45/16; B01D 53/265; B64D 13/06; B64D 2013/0666
See application file for complete search history.

(56) References Cited

U.S. PATENT DOCUMENTS

| | | | | |
|---|---|---|---|---|
| 948,062 A | * | 2/1910 | Morgan | F23B 7/00 55/315 |
| 1,306,003 A | * | 6/1919 | Good | B01D 45/16 237/68 |
| 1,387,748 A | * | 8/1921 | Wilson | B01D 19/0057 96/195 |
| 1,799,684 A | * | 4/1931 | Gilbert | F04F 5/08 96/171 |
| 1,958,577 A | * | 5/1934 | Hirshfeld | B01D 45/12 55/355 |

(Continued)

FOREIGN PATENT DOCUMENTS

| | | |
|---|---|---|
| EP | 4112473 A1 | 1/2023 |
| KR | 20170101026 A | 9/2017 |

OTHER PUBLICATIONS

Search Report issued in European Patent Application No. 23169556.0; Application Filing Date Apr. 24, 2023; Date of Mailing Oct. 9, 2023 (8 pages).

*Primary Examiner* — Dung H Bui
(74) *Attorney, Agent, or Firm* — CANTOR COLBURN LLP

(57) ABSTRACT

A water extractor is provided and includes a helical channel, a toroidal body encompassing the helical channel and defining an exhaust plenum beyond the helical channel and comprising a first outlet, an outer body defining a settling chamber about the toroidal body and including a second outlet and a drain and a scupper disposed to direct moisture, which is separated from a medium flowing through the helical channel, from the helical channel and into the settling chamber. The medium is flowable from the helical channel into the exhaust plenum and then sequentially through the first and second outlets to pressurize collected moisture flow from the settling chamber and through the drain.

16 Claims, 6 Drawing Sheets

(56) References Cited

U.S. PATENT DOCUMENTS

| | | | | |
|---|---|---|---|---|
| 2,015,076 | A * | 9/1935 | Loumiet Et Lavigne | B01D 45/12, 55/461 |
| 2,193,460 | A * | 3/1940 | Loumiet Et Lavigne | B01D 5/0006, 55/461 |
| 2,705,053 | A * | 3/1955 | Morris | F16N 39/002, 210/512.1 |
| 2,889,044 | A * | 6/1959 | Cloos | B03B 5/626, 494/47 |
| 3,603,569 | A * | 9/1971 | Abboud | F27B 7/20, 432/16 |
| 3,706,383 | A * | 12/1972 | Palma | B01D 45/16, 210/374 |
| 3,875,061 | A * | 4/1975 | Palma | B04B 5/00, 210/243 |
| 3,951,813 | A * | 4/1976 | Palma | B04C 3/02, 210/512.1 |
| 4,179,273 | A * | 12/1979 | Montusi | B01D 21/265, 210/512.1 |
| 4,681,610 | A * | 7/1987 | Warner | B01D 45/16, 55/394 |
| 6,958,107 | B1 * | 10/2005 | Clarke | B04C 3/04, 202/175 |
| 6,981,995 | B2 * | 1/2006 | Lombana | B01D 45/12, 96/216 |
| 7,708,146 | B2 * | 5/2010 | Kruyer | B03D 1/1418, 210/512.1 |
| 8,025,713 | B2 * | 9/2011 | Dou | B04C 11/00, 55/459.3 |
| 8,875,535 | B2 * | 11/2014 | Peacos, III | B64D 13/00, 62/93 |
| 10,265,651 | B2 | 4/2019 | Zager et al. | |
| 10,765,982 | B2 | 9/2020 | Martin et al. | |
| 11,154,804 | B2 | 10/2021 | Palmer | |
| 11,179,661 | B2 | 11/2021 | Devereux et al. | |
| 2006/0021356 | A1 * | 2/2006 | Milde | B04C 3/06, 62/93 |
| 2006/0191415 | A1 * | 8/2006 | Johnson | F01N 1/125, 96/108 |
| 2007/0084340 | A1 | 4/2007 | Dou et al. | |
| 2015/0151231 | A1 * | 6/2015 | Loh | B04C 5/06, 95/271 |
| 2016/0279552 | A1 * | 9/2016 | Gentry | B01D 53/02 |
| 2018/0229586 | A1 * | 8/2018 | Army | B60H 3/0658 |
| 2018/0354626 | A1 * | 12/2018 | Himmelmann | B64D 13/06 |
| 2019/0009203 | A1 * | 1/2019 | Himmelmann | B64D 13/08 |
| 2019/0118131 | A1 | 4/2019 | Schaub et al. | |
| 2019/0276155 | A1 * | 9/2019 | Walsh | B01D 5/0081 |
| 2019/0388817 | A1 * | 12/2019 | Army | B01D 45/16 |
| 2021/0346828 | A1 * | 11/2021 | Kulakovskij | B01D 45/16 |
| 2022/0411073 | A1 * | 12/2022 | Army | B01D 45/04 |

* cited by examiner

MID-PRESSURE WATER COLLECTOR (MPWC) WITH HELICAL FLOW CHANNEL AND RADIAL SCUPPERS

BACKGROUND

The following description relates to water collection in an environmental control system (ECS) of an aircraft and, more specifically, to an MPWC with a helical flow channel and radial scuppers.

As a humid airflow is cooled within a component of an ECS of an aircraft, condensation typically forms resulting in moisture being entrained within the airflow. This moisture, which is commonly droplets of water, is generally removed by a water collector. If the moisture is not removed from the airflow, the moisture may freeze causing a build-up of ice on one or more components of the ECS. The ice can lead to imbalance due to non-uniform ice shedding, thereby reducing system reliability and efficiency. A moisture resulting from a build-up of ice can also lead to corrosion of system components.

BRIEF DESCRIPTION

According to an aspect of the disclosure, a water extractor is provided and includes a helical channel, a toroidal body encompassing the helical channel and defining an exhaust plenum beyond the helical channel and comprising a first outlet, an outer body defining a settling chamber about the toroidal body and including a second outlet and a drain and a scupper disposed to direct moisture, which is separated from a medium flowing through the helical channel, from the helical channel and into the settling chamber. The medium is flowable from the helical channel into the exhaust plenum and then sequentially through the first and second outlets to pressurize collected moisture flow from the settling chamber and through the drain.

In accordance with additional or alternative embodiments, the helical channel includes one, two or more revolutions in the toroidal body.

In accordance with additional or alternative embodiments, the helical channel has one of an annular cross-section, a polygonal cross-section and a cross-section of varying shape.

In accordance with additional or alternative embodiments, the scupper includes a scupper gap forming body along an outer wall of the helical channel.

In accordance with additional or alternative embodiments, the scupper gap forming body includes a chamfered scupper lip.

In accordance with additional or alternative embodiments, the scupper is an insert that is insertable into the toroidal body.

In accordance with additional or alternative embodiments, the scupper is disposed to direct downwardly flowing moisture from the helical channel and into the settling chamber.

In accordance with additional or alternative embodiments, canted secondary scuppers are disposed to direct moisture, which is separated from the medium, from the exhaust plenum to the settling chamber.

In accordance with additional or alternative embodiments, a fin arrangement prevents moisture egress through the second outlet.

According to an aspect of the disclosure, a water extractor is provided and includes a helical channel, a toroidal body encompassing the helical channel and defining an exhaust plenum beyond the helical channel and comprising a first outlet, an outer body defining a settling chamber about the toroidal body and including a second outlet and a drain and an insert. The insert is insertable into the toroidal body, and includes an annular scupper disposed to direct moisture, which is separated from a medium flowing through the helical channel, from the helical channel and into the settling chamber. The medium is flowable from the helical channel into the exhaust plenum and then sequentially through the first and second outlets to pressurize collected moisture flow from the settling chamber and through the drain.

In accordance with additional or alternative embodiments, the helical channel includes one, two or more revolutions in the toroidal body.

In accordance with additional or alternative embodiments, the helical channel has one of an annular cross-section, a polygonal cross-section and a cross-section of varying shape.

In accordance with additional or alternative embodiments, the annular scupper is angled normally with respect to the helical channel.

In accordance with additional or alternative embodiments, the annular scupper is disposed to direct downwardly flowing moisture from the helical channel and into the settling chamber.

In accordance with additional or alternative embodiments, the annular scupper includes a flange defining an opening communicative with the settling chamber, leading and trailing sides supported on the flange, the leading side defining a leading side aperture and the trailing side defining a trailing side aperture and an annular body, which is supported in the trailing side aperture by the trailing side and which extends beyond the leading side to form a gap with the leading side in the leading side aperture, the gap being communicative with the opening.

In accordance with additional or alternative embodiments, canted secondary scuppers are disposed to direct moisture, which is separated from the medium, from the exhaust plenum to the settling chamber.

In accordance with additional or alternative embodiments, a fin arrangement prevents moisture egress through the second outlet.

According to an aspect of the disclosure, an annular scupper is provided and includes a flange defining an opening, a leading side supported on the flange and defining a leading side aperture, a trailing side supported on the flange and defining a trailing side aperture and an annular body, which is supported in the trailing side aperture by the trailing side and which extends beyond the leading side to form a gap with the leading side in the leading side aperture, the gap being communicative with the opening.

In accordance with additional or alternative embodiments, the gap is recessed from a leading edge of the annular body.

In accordance with additional or alternative embodiments, the leading and trailing sides taper together with increasing distance from the flange.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an MPWC with a helical flow channel and radial scuppers is provided with helical revolutions for the helical flow channel. The MPWC centrifuges water droplets and/or fog coming out of an ACM turbine and directs coalesced free moisture into radial scuppers that are connected to a downstream settling chamber where the free moisture is collected and removed from the system.

Figure 1:
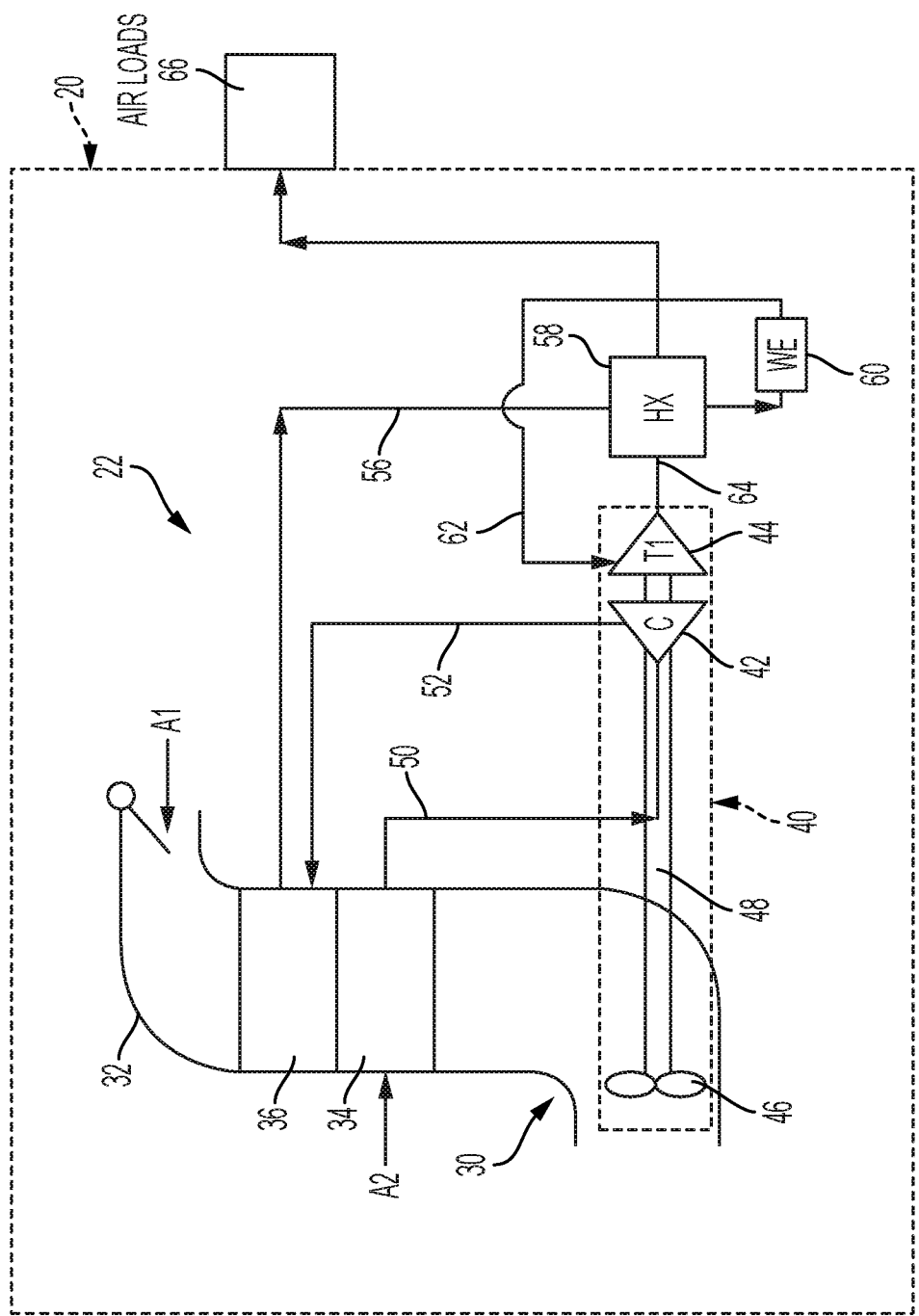
FIG. 1 is a schematic diagram of an example of an ECS of a vehicle in accordance with embodiments.

With reference to FIG. 1, a schematic diagram of an example of a portion 22, also referred to as a "pack," of an ECS 20 is shown. It is to be understood that, although the ECS 20 is described with reference to an aircraft, alternative applications are also within the scope of this disclosure.

Each pack 22 includes a RAM air circuit 30 including a shell or duct 32 within which one or more heat exchangers are located. The shell 32 can receive and direct a medium A1, such as ram air for example, through a portion of the ECS 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate and fluid heat exchangers.

The one or more heat exchangers arranged within the shell 32 may be referred to as ram heat exchangers and can include a primary heat exchanger 34 and a secondary heat exchanger 36. Within the primary heat exchanger 34 and the secondary heat exchanger 36, ram air, such as outside air for example, acts as a heat sink to cool one or more mediums.

The pack 22 additionally includes at least one compressing device 40. Each compressing device 40 includes a compressor 42, a turbine 44 and a fan 46, all of which are operably coupled to one another via a shaft 48. The fan 46, the compressor 42 and the turbine 44 cooperatively define an air cycle machine (ACM). The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc.

The turbine 44 is a mechanical device that expands and extracts work from a medium (also referred to as extracting energy). In the compressing device 40, the turbine 44 drives the compressor 42 and the fan 46 via the shaft 48. The fan 46 is a mechanical device that can force via push or pull methods the medium A1 (e.g., ram air) through the shell 32 and across the primary heat exchanger 34 and the secondary heat exchanger 36 at a variable rate to control temperatures.

In operation, the pack 22 is supplied with a medium A2, such as air bled from a gas turbine engine of the aircraft for example. It should be understood that the ECS 20 may include any number of packs 22 configured to supply conditioned air to various heat loads of the aircraft. The medium A2 is input to the primary heat exchanger 34 such that the medium A2 is in a heat exchange relationship with another medium A1, such as ram or ambient air for example. After the bleed air A2 is cooled in the primary heat exchanger 34, the resulting cooler air is communicated through a passage 50 to the compressor 42 of the compressing device 40. Within the compressor, the medium A2 is compressed to a high pressure.

Compressed medium A2 exits the compressor 42 through a passage 52 and is provided to the secondary heat exchanger 36 where the second medium A2 is further cooled by heat exchange with the first medium A1. Compressed, cooled air having water vapor entrained therein exits from the secondary heat exchanger 36 and flows through a duct 56 to a condensing heat exchanger 58. The condensing heat exchanger 58 is configured to further cool the second medium A2 and water is separated from the cooled second medium A2 via a water extractor 60. Dehumidified air exits the water extractor 60 and is provided, through a passage 62, to the turbine 44. The bleed air A2 is expanded and water vapor in the air is further condensed through the turbine 44 of the ACM 40. The cooled second medium A2 flows through a passage 64 back to the condensing heat exchanger 58, where the air is heated to a relatively warmed temperature, and is then supplied to the one or more air loads (illustrated schematically at 66) of the aircraft, such as to the cabin for example.

It should be understood that the pack 22 illustrated and described herein is intended as an example only, and that any ECS 20 including a water extractor 60 is within the scope of the disclosure. In an embodiment, the ECS 20 may be configured such that the water extractor 60 is arranged directly downstream from an outlet of the turbine 44. In such embodiments, the water contained within the airflow provided to the water extractor 60 is a fine mist or fog.

With reference to FIGS. 2-5, the water extractor 60 of FIG. 1 will now be described in greater detail.

Figure 2:
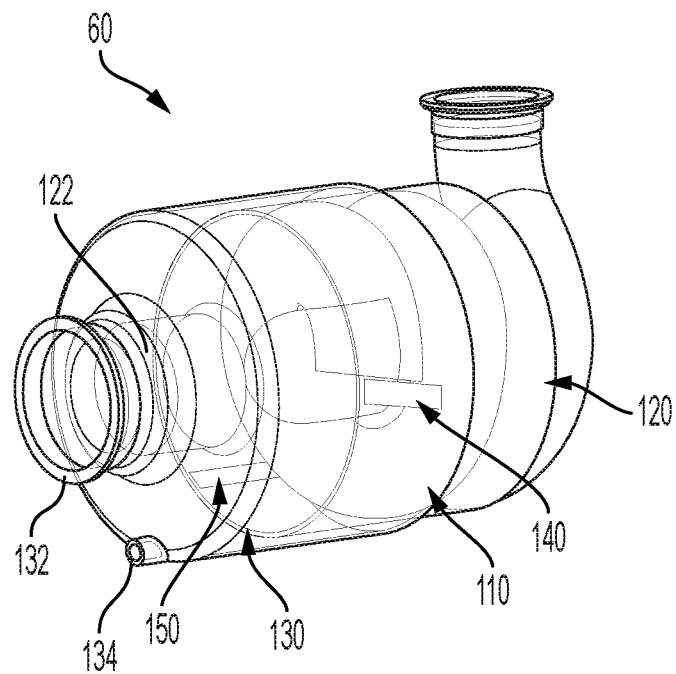
FIG. 2 is a perspective view of an exterior of a water extractor of the ECS of FIG. 1 in accordance with embodiments.
Figure 3A:
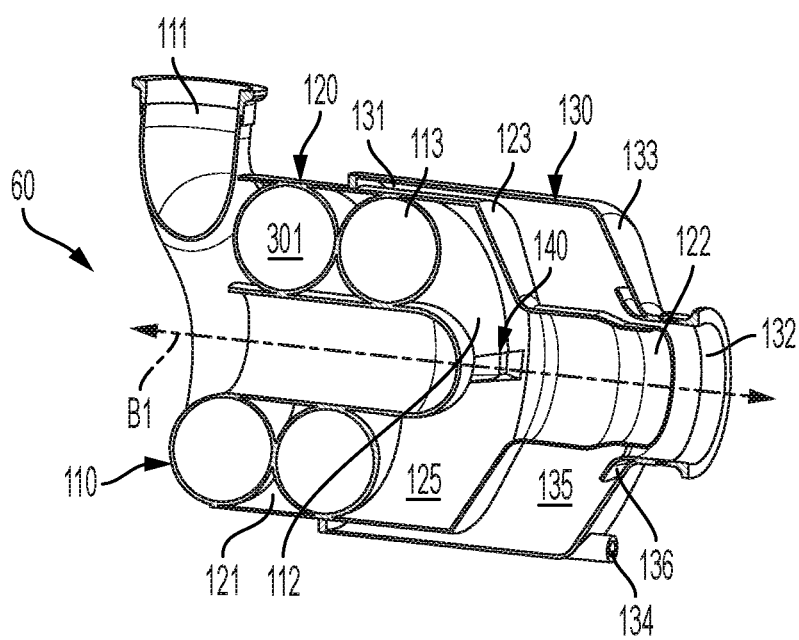
FIG. 3A is a cutaway perspective view of an interior of the water extractor of the ECS of FIG. 1 in accordance with embodiments.
Figure 3B:
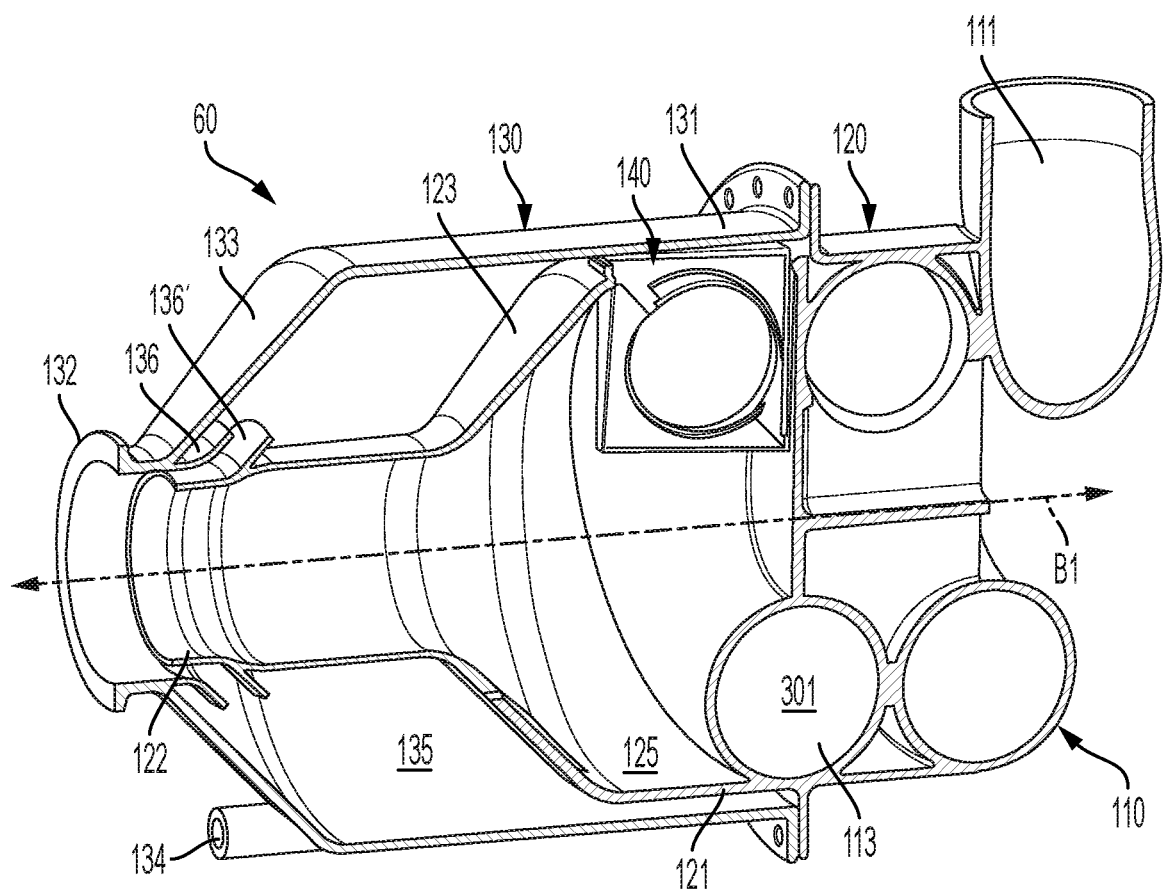
FIG. 3B is a cutaway perspective view of an interior of the water extractor of the ECS of FIG. 1 in accordance with embodiments

As shown in FIGS. 2, 3A and 3B in particular, the water extractor 60 includes a helical channel 110, a toroidal body 120, an outer body 130 and a scupper 140.

The helical channel 110 includes an inlet 111, an outlet 112 and a helical section 113 fluidly interposed between the inlet 111 and the outlet 112. A medium, such as an airstream enters the helical channel 110 via the inlet 111 and passes through the helical section 113 before exiting the helical channel 110 via the outlet 112. Within the helical section 113, the moisture, such as water, is removed from the medium by centrifugal forces and generally flows along a radially outer side of the helical section 113 whereas the air flows through the middle and along a radially interior side of the helical section 113.

The toroidal body 120 is elongate along longitudinal axis B1 and includes toroidal section 121, a first outlet 122 and a tapered section 123 axially interposed between the toroidal section 121 and the first outlet 122. The toroidal section 121 encompasses at least the helical section 113 and the outlet 112 of the helical channel 110. The toroidal section 121 and the tapered section 123 cooperatively define an exhaust plenum 125 beyond the outlet 112 such that, as the medium exits the helical channel 110 via the outlet 112, the medium enters into the exhaust plenum 125. The tapered section 123 is tapered inwardly with decreasing distance toward the first outlet 122 along the longitudinal axis B1 to urge the medium to flow from the exhaust plenum 125 and toward and through the first outlet 122.

In accordance with embodiments, the helical section 113 of the helical channel 110 can include one, two or more helix revolutions in the toroidal section 121 of the toroidal body 120. These one, two or more helix revolutions provide the helical section 113 with sufficient helical or circumferential length to allow for a desired amount of moisture separation from the medium.

Figure 4:
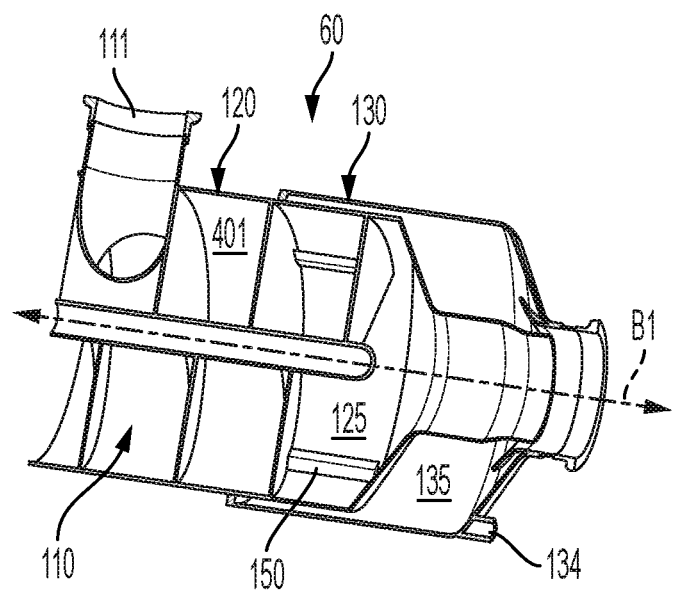
FIG. 4 is a cutaway perspective view of an interior of the water extractor of the ECS of FIG. 1 in accordance with alternative embodiments.

In accordance with further embodiments and as shown in FIGS. 3A, 3B and 4, the helical section 113 of the helical channel 110 has one of an annular or circular cross-section 301 (see FIGS. 3A and 3B), a polygonal or rectangular cross-section 401 (see FIG. 4) and a cross-section of varying shape, such as a case in which the helical section 113 has a circular cross section that becomes increasingly annular with decreasing distance toward the first outlet 122 along the longitudinal axis B1.

The outer body 130 includes a cylindrical section 131, a second outlet 132, a tapered section 133 axially interposed between the cylindrical section 131 and the second outlet 132 and a drain 134. The cylindrical section 131 is disposed about the tapered section 123 and about respective proximal portions of the toroidal section 121 and the first outlet 122. The second outlet 132 is disposed adjacent to and about the first outlet 122 along the longitudinal axis B1 to form a narrow channel about the first outlet 122. The tapered section 133 is tapered inwardly with decreasing distance toward the second outlet 132 along the longitudinal axis B1. The cylindrical section 131 and the tapered section 133 cooperatively define a settling chamber 135 about the tapered section 123 and about respective proximal portions of the toroidal section 121 and the first outlet 122. The drain 134 is disposed and configured to allow for moisture that collects in the settling chamber 135 to drain out of the settling chamber 135.

At least the outer body 130 can also include a fin arrangement 136 to prevent moisture egress through the second outlet 132 (i.e., through the narrow channel defined about the first outlet 122). The fin arrangement 136 can be provided as a fin that extends from the second outlet 132 and toward the cylindrical section 131 while tapering away from a proximal portion of the tapered section 133. Moisture that collects in the setting chamber 135 that migrates along the tapered section 133 toward the second outlet 132 is prevented from exiting through the second outlet 132 by the fin arrangement 136. In some cases, the fin arrangement 136' can also be provided on the first outlet 122 of the toroidal body 120 as shown in FIG. 3B. In these or other cases, the fin arrangement 136' can be provided as a fin that extends from the first outlet 122 and toward the toroidal section 121 while tapering away from a proximal portion of the first outlet 122. Moisture that collects in the setting chamber 135 that migrates along the tapered section 123 and/or the tubular member leading to the first outlet 122 toward the first outlet 122 is prevented from exiting through the second outlet 132 by the fin arrangement 136'.

The scupper 140 is disposed to direct moisture, which is separated from the medium flowing through the helical channel 110, from the helical channel 110 and into the settling chamber 135. As such, with the medium being flowable from the helical channel 110 into the exhaust plenum 125 and then sequentially through the first outlet 122 and the second outlet 132, the medium effectively urges (i.e., pressurizes or entrains) a flow of the collected moisture from the settling chamber 135 and through the drain 134.

In accordance with further embodiments and as shown in FIGS. 3A, 3B, 4 and 5, the water extractor 60 can further include secondary scuppers 150. The secondary scuppers 150 can be provided as one, two or more than two secondary scuppers 150 that are disposed and configured to direct moisture, which is separated from the medium flowing through the helical channel 110 and the outlet 112 into the exhaust plenum 125, from the exhaust plenum 125 to the settling chamber 135. The secondary scuppers 150 can be canted at an angle $\alpha$ (see FIG. 4) and can be provided along the toroidal section 121 within the exhaust plenum 125 to direct moisture that is not captured by the scupper 140 into the settling chamber 135. Each secondary scupper 150 includes a lip 151 disposed along an elongate opening in the toroidal section 121.

While numbers of the secondary scuppers 150 can vary, it is to be understood that the number may be limited (e.g., to two secondary scuppers 150) to avoid diverting an excess of the medium from the exhaust plenum 125 to the settling chamber 135.

In addition, although the scupper 140 and the secondary scuppers 150 can be placed at various circumferential positions about the longitudinal axis B1, the scupper 140 can in some cases be placed at about the 3:00 position as shown in FIG. 4 with the secondary scuppers 150 at about 6:00 and 9:00. In these positions, moisture separation effects provided by the scupper 140 and the secondary scuppers 150 can be maximized. For example, with the scupper 140 placed at the 3:00 position, the scupper 140 is disposed to direct downwardly flowing moisture from the radially outer wall of the helical section 113 of the helical channel 110 and into the settling chamber 135.

It is to be understood that in cases in which the water extractor 60 is deployed in an aircraft or another vehicle, an attitude of the aircraft can alter an attitude of the scupper 140 and the secondary cuppers 150 in a manner that could momentarily limit their effectiveness in moisture separation. It is to be further understood, however, that these are transient conditions and that, during normal operations of the aircraft/vehicle, the scupper 140 and the secondary scuppers 150 will be positioned at their respective 3:00, 6:00 and 9:00 positions.

Figure 5:
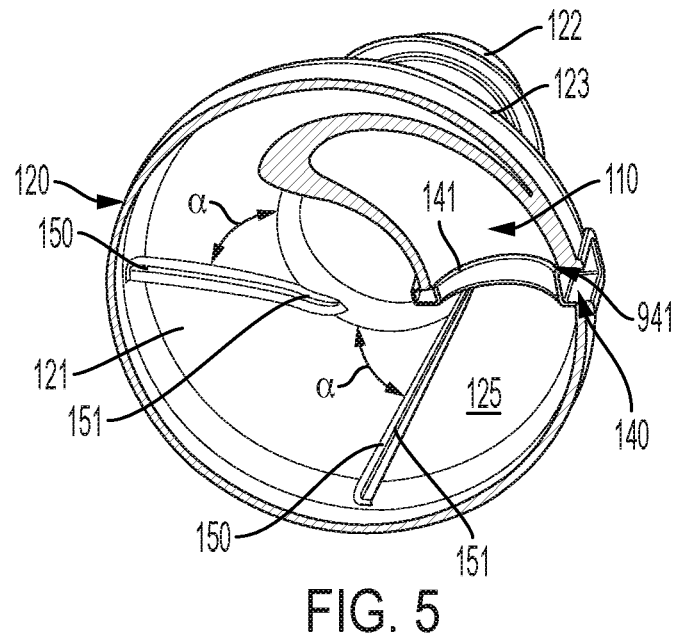
FIG. 5 is a perspective view of a scupper and secondary scuppers of a water extractor in accordance with embodiments.
Figure 6:
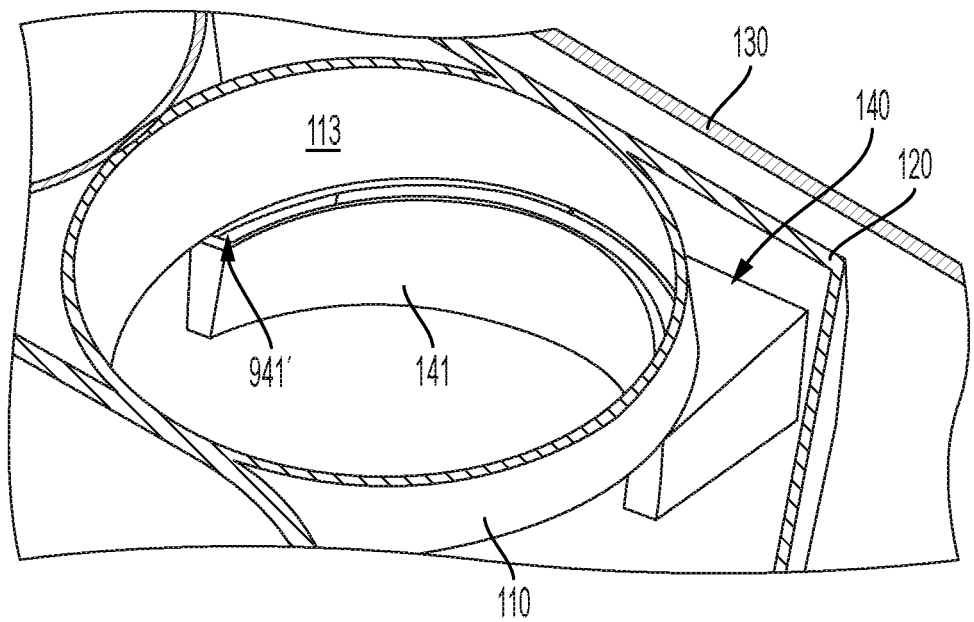
FIG. 6 is a cutaway perspective view of a semi-annular scupper in accordance with embodiments.
Figure 7:
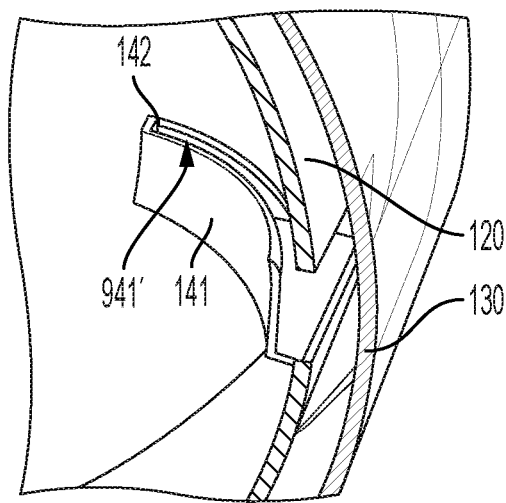
FIG. 7 is an enlarged perspective view of a chamfered lip of the semi-annular scupper of FIG. 6 in accordance with embodiments.

With continued reference to FIG. 5 and with additional reference to FIGS. 6 and 7, the scupper 140 includes a scupper gap forming body 141 that is disposable along at least an outer wall of the helical section 113 of the helical channel 110. The scupper gap forming body 141 can be provided with an annular scupper element (see FIG. 5) or a semi-annular scupper element (see FIG. 6). In either case, the scupper gap forming body 141 can include a chamfered scupper lip 142 (see FIG. 7), which is angled to encourage moisture flow out of the helical section 113 of the helical channel 110.

The scupper 140 can be generally provided as an insert (see FIG. 5) that is insertable into the toroidal body 120.

Figure 8:
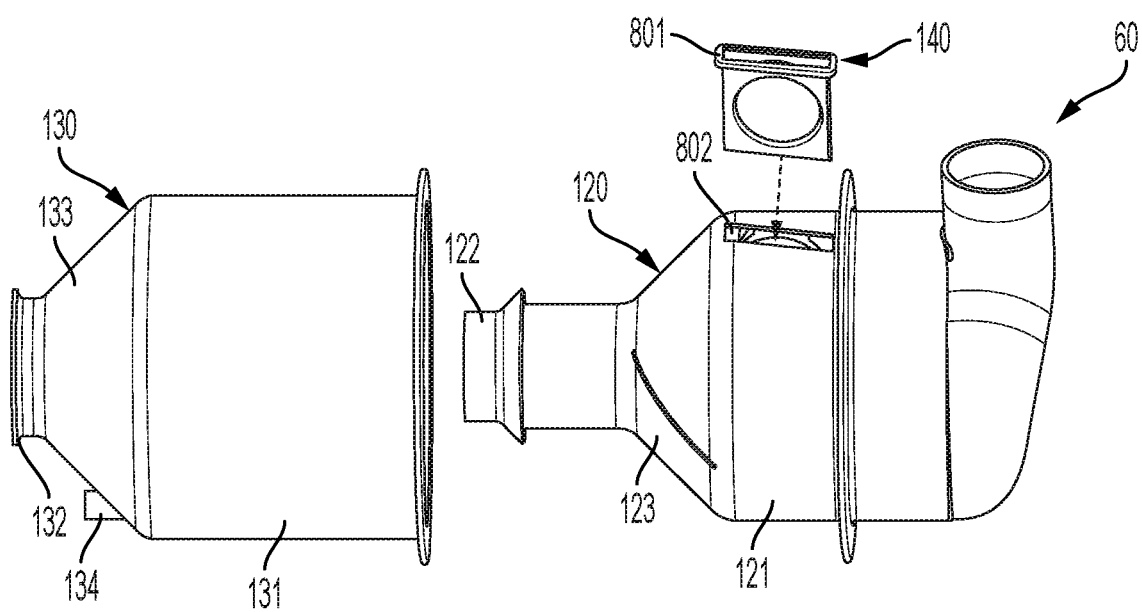
FIG. 8 is a side view of a water extractor and an insert provided as an annular scupper in accordance with embodiments.
Figure 9:
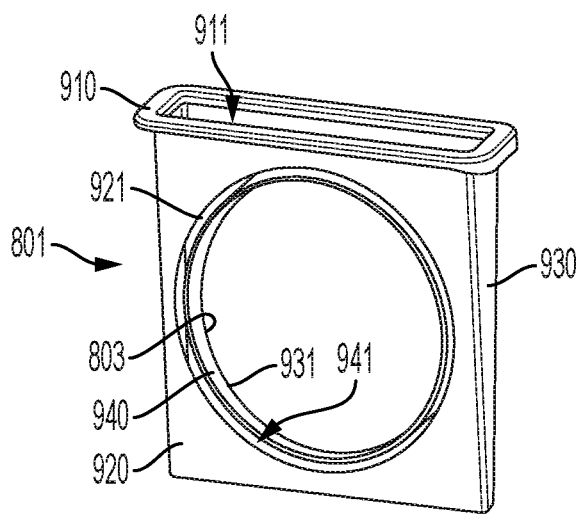
FIG. 9 is a perspective view of the insert of FIG. 8 in accordance with embodiments.

With reference to FIGS. 8 and 9, the water extractor 60 can include the helical channel 110, the toroidal body 120, the outer body 130 generally as described above with reference to FIGS. 2-5 as well as an insert 801. The insert 801 is insertable into the toroidal body 120 through slot 802 and, as described above, is provided as an annular scupper 803 (see FIG. 9) or as a semi-annular scupper (see FIG. 6) that is disposed to direct moisture, which is separated from a medium flowing through the helical channel 110, from the helical channel 110 and into the settling chamber 135.

As shown in FIG. 9, the annular scupper 803 includes a flange 910 by which the annular scupper 803 is securable to the toroidal body 120. The flange 910 is formed to define an opening 911, which is communicative with the settling chamber 135 (see FIGS. 3A, 3B and 4). The annular scupper 803 further includes a leading side 920, which faces toward incoming medium flow in the helical section 113 of the helical channel 110, a trailing side 930, which faces away from the incoming medium flow in the helical section 113, and an annular body 940. Both the leading side 920 and the trailing side 930 are supported on the flange 910 and taper together with increasing distance from the flange 910. The leading side 920 is formed to define a leading side aperture 921 and the trailing side 930 is formed to define a trailing side aperture 931. The annular body 940 is supported in the trailing side aperture 931 by edges of the trailing side 930 at the trailing side aperture 931 and extends axially forwardly beyond the leading side 920. In this way, the annular body 940 form a gap 941 with the edges of the leading side 920 in the leading side aperture 921. The gap 941 can be recessed from a leading edge 942 of the annular body 940 and is fluidly communicative with the opening 911 formed by the flange 910.

As moisture separated from the medium flowing through the helical channel 110 moves along the wall of the helical section 113 of the helical channel 110, the moisture passes the leading edge 942 of the annular body 940 and enters the annular scupper 803 through the gap 941. The moisture continues moving through the annular scupper 803 and exits via the opening 911 of the flange 910 into the settling chamber 135.

It is to be understood that, where the insert 801 is provided as the semi-annular scupper (see FIG. 6), the semi-annular scupper has a similar construction as the annular scupper 803 of FIGS. 8 and 9 except that, where the gap 941 of the annular scupper 803 is a continuous annulus, the corresponding gap 941' in the semi-annular scupper is a continuous semi-annulus.

Technical effects and benefits of the present disclosure are the provision of a MPWC with the helical flow channel and the radial scuppers that provides for a compact method to centrifuge and coalesce water droplets and/or fog for collection and removal from an ECS. The MPWC with the helical flow channel and the radial scuppers can also minimizing or eliminating a need for a condenser in an ECS. In addition, chamfered radial scuppers can be provided in-line with centrifugal flow to maximize free water capture and a circumferential drain channel can enable optimized placement or connection of radial scuppers to a settling chamber.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A water extractor, comprising:
   a helical channel;
   a toroidal body encompassing the helical channel and defining an exhaust plenum beyond the helical channel and comprising a first outlet;
   an outer body defining a settling chamber about the toroidal body and comprising a second outlet and a drain; and
   a scupper disposed to direct moisture, which is separated from a medium flowing through the helical channel, from the helical channel and into the settling chamber,
   the medium being flowable from the helical channel into the exhaust plenum and then sequentially through the first and second outlets to pressurize collected moisture flow from the settling chamber and through the drain,
   wherein the scupper is an insert that is insertable into the toroidal body.

2. The water extractor according to claim 1, wherein the helical channel comprises one, two or more revolutions in the toroidal body.

3. The water extractor according to claim 1, wherein the helical channel has a polygonal cross-section.

4. The water extractor according to claim 1, wherein the scupper comprises a scupper gap forming body along an outer wall of the helical channel.

5. The water extractor according to claim 4, wherein the scupper gap forming body comprises a chamfered scupper lip.

6. The water extractor according to claim 1, wherein the scupper is disposed to direct downwardly flowing moisture from the helical channel and into the settling chamber.

7. The water extractor according to claim 1, further comprising canted secondary scuppers disposed to direct moisture, which is separated from the medium, from the exhaust plenum to the settling chamber.

8. The water extractor according to claim 1, further comprising a fin arrangement to prevent moisture egress through the second outlet.

9. A water extractor, comprising:
   a helical channel;
   a toroidal body encompassing the helical channel and defining an exhaust plenum beyond the helical channel and comprising a first outlet;
   an outer body defining a settling chamber about the toroidal body and comprising a second outlet and a drain; and
   an insert, which is insertable into the toroidal body, and which comprises an annular scupper disposed to direct moisture, which is separated from a medium flowing through the helical channel, from the helical channel and into the settling chamber,
   the medium being flowable from the helical channel into the exhaust plenum and then sequentially through the first and second outlets to pressurize collected moisture flow from the settling chamber and through the drain.

10. The water extractor according to claim 9, wherein the helical channel comprises one, two or more revolutions in the toroidal body.

11. The water extractor according to claim 9, wherein the helical channel has one of an annular cross-section, a polygonal cross-section and a cross-section of varying shape.

12. The water extractor according to claim 9, wherein the annular scupper is angled normally with respect to the helical channel.

13. The water extractor according to claim 9, wherein the annular scupper is disposed to direct downwardly flowing moisture from the helical channel and into the settling chamber.

14. The water extractor according to claim 9, wherein the annular scupper comprises:
   a flange defining an opening communicative with the settling chamber;
   leading and trailing sides supported on the flange, the leading side defining a leading side aperture and the trailing side defining a trailing side aperture; and
   an annular body, which is supported in the trailing side aperture by the trailing side and which extends beyond the leading side to form a gap with the leading side in the leading side aperture, the gap being communicative with the opening.

15. The water extractor according to claim 9, further comprising canted secondary scuppers disposed to direct moisture, which is separated from the medium, from the exhaust plenum to the settling chamber.

16. The water extractor according to claim 9, further comprising a fin arrangement to prevent moisture egress through the second outlet.

* * * * *